(12) United States Patent
Dhammawat et al.

(10) Patent No.: US 11,678,402 B2
(45) Date of Patent: Jun. 13, 2023

(54) EFFICIENT SESSION MANAGEMENT

(71) Applicant: Cisco Technology, Inc., San Jose, CA (US)

(72) Inventors: Abhishek Dhammawat, San Jose, CA (US); Mahesh Satyanarayana, Fremont, CA (US); Srinath Gundavelli, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 149 days.

(21) Appl. No.: 17/142,914

(22) Filed: Jan. 6, 2021

(65) Prior Publication Data

US 2022/0217814 A1  Jul. 7, 2022

(51) Int. Cl.
| | |
|---|---|
| H04W 80/00 | (2009.01) |
| H04W 80/10 | (2009.01) |
| H04L 67/14 | (2022.01) |
| H04W 76/12 | (2018.01) |
| H04W 76/11 | (2018.01) |

(52) U.S. Cl.
CPC ............ *H04W 80/10* (2013.01); *H04L 67/14* (2013.01); *H04W 76/11* (2018.02); *H04W 76/12* (2018.02)

(58) Field of Classification Search
None
See application file for complete search history.

(56) References Cited

U.S. PATENT DOCUMENTS

| | | | |
|---|---|---|---|
| 2018/0199398 A1* | 7/2018 | Dao | H04W 76/27 |
| 2019/0261260 A1 | 8/2019 | Dao et al. | |
| 2019/0394833 A1* | 12/2019 | Talebi Fard | H04W 76/11 |
| 2020/0053828 A1 | 2/2020 | Bharatia et al. | |
| 2021/0105196 A1* | 4/2021 | Dao | H04L 43/028 |

FOREIGN PATENT DOCUMENTS

| | | | |
|---|---|---|---|
| WO | 2020140226 A1 | 7/2020 | |
| WO | WO-2021094025 A1 * | 5/2021 | H04W 76/12 |

OTHER PUBLICATIONS

Cisco, "N4 Session Management, Node Level, and Reporting Procedures", Cisco Ultra Cloud Core, retrieved from Internet Oct. 28, 2020, 14 pages.
TecTec, "SMF and UPF Interactions", retrieved from Internet Oct. 28, 2020, 5 pages.
3GPP, 3rd Generation Partnership Project; Technical Specification Group Core Network and Terminals; Interface between the Control Plane and the User Plane Nodes; Stage 3 (Release 16), 3GPP TS 29.244 V16.5.0, Sep. 2020, 313 pages.

\* cited by examiner

*Primary Examiner* — Gerald A Smarth
(74) *Attorney, Agent, or Firm* — Edell, Shapiro & Finnan, LLC

(57) ABSTRACT

A network function is configured to initiate a bulk session cleanup with a single release request. The network function detects a configuration change to a wireless network system that affects multiple user sessions for multiple user devices. The network function generates a single bulk session release request identifying the affected user sessions and provides the single bulk session release request to at least one other network function responsible for the user sessions.

20 Claims, 7 Drawing Sheets

EFFICIENT SESSION MANAGEMENT

TECHNICAL FIELD

The present disclosure relates to network management of user sessions, particularly in network deployments with separate user plane and control plane functions.

BACKGROUND

The Third Generation Partnership Project (3GPP) specifications define Packet Forwarding Control Protocol (PFCP) node report messages for General Packet Radio Service (GPRS) Tunneling Protocol (GTP) path management failure that sends notifications from the user plane about next Generation Node B (gNB) failure. Using these PFCP node report messages, the User Plane Function (UPF) may notify Control Plane Functions (CPFs) to trigger the cleanup of each session related to the failed gNB. The 3GPP specifications typically handle session cleanup on the level of the individual session rather than as a node level procedure.

DESCRIPTION OF EXAMPLE EMBODIMENTS

Overview

Figure 1:
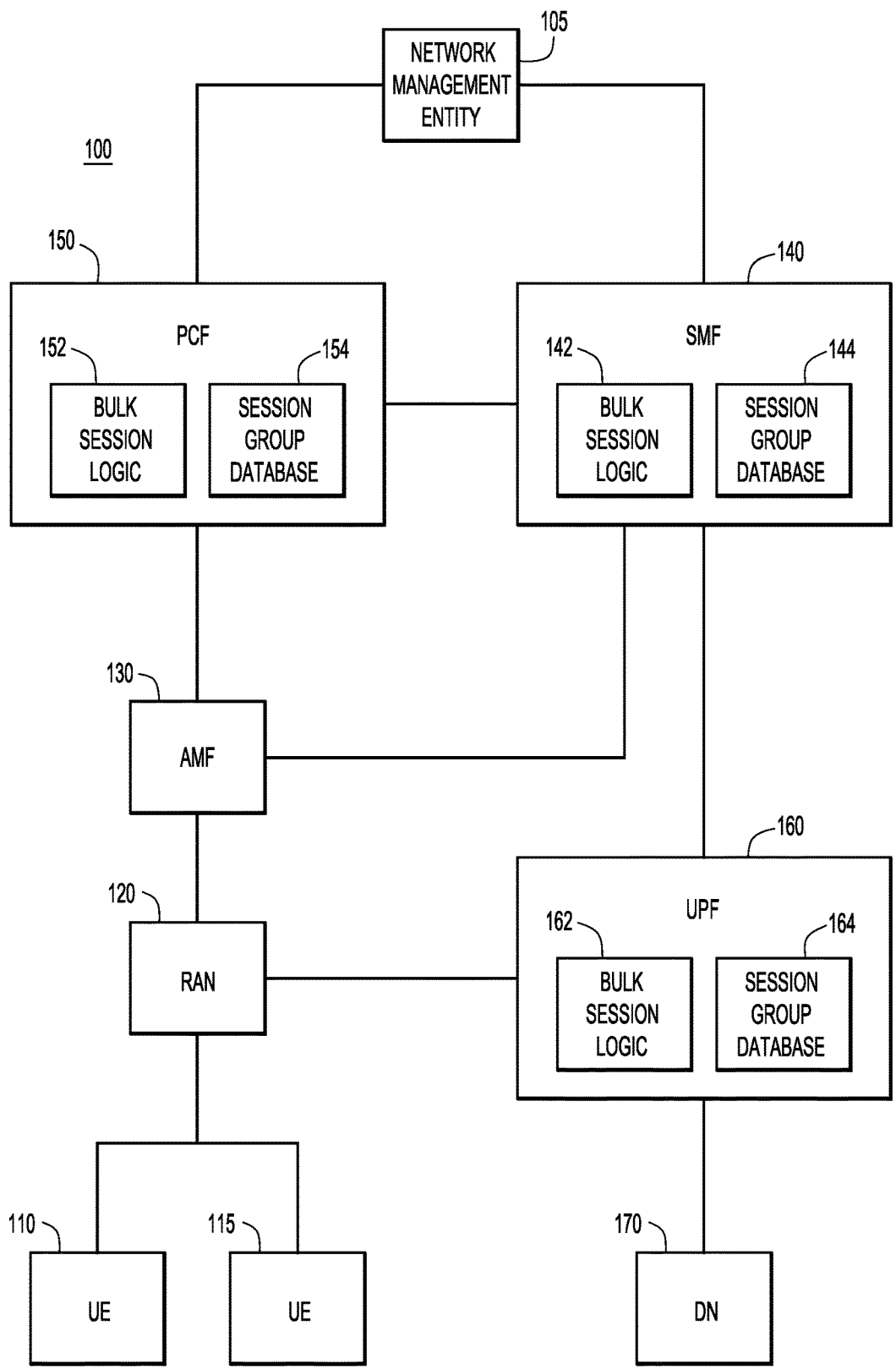
FIG. 1 is a simplified block diagram of a network system, according to an example embodiment.

A computer implemented method is provided for a network function to initiate a bulk session cleanup with a single release request. The method includes detecting a configuration change to a wireless network system that affects a plurality of user sessions for a plurality of UE. The method also includes generating a single bulk session release request identifying the plurality of user sessions and provides the single bulk session release request to at least one other network function responsible for the plurality of user sessions.

EXAMPLE EMBODIMENTS

With the advent of Internet of Things (IoT) in enterprise networks, regulators are increasingly working toward opening up private networks as well as shared spectrum in Fifth Generation (5G) deployments. In an enterprise deployment with a large number of user sessions (e.g., tens of thousands of user sessions, depending on the platform), the network may trigger bulk session cleanup between the Session Management Function (SMF) and the User Plane Function (UPF). The 3GPP standards currently do not provide any mechanism for bulk session cleanup, requiring the SMF to send individual session release request messages to the UPF for session cleanup.

Restoration procedures for Public Data Network (PDN) Gateway (PGW) failures under current 3GPP standards capture partial failure on a Fully Qualified Connection Set Identifier (FQ-CSID) basis for Fourth Generation (4G) Control/User Plane Separation (CUPS). The techniques described herein enable the 5G functionality of deleting session from triggers at the UPF or the SMF when a critical configuration-related policy (e.g., Quality of Service (QoS), Access Control List (ACL), or Virtual Routing and Forwarding (VRF)) are changed. The session deletion functionality may also be triggered by an operator for all sessions related to a particular Data Network Name (DNN), gNB, or group ID (e.g., upgrading a set of factory floor cameras that belong to a group).

Network management systems may be enhanced to trigger bulk session cleanup to individual network functions (e.g., SMF or UPF), but are not typically enabled to handle use cases in which there are changes on a Command Line Interface (CLI) of individual nodes. Additionally, in deployments in which the SMF is in the cloud and the UPF is on-premise, the management system may only have a communication link with the SMF. In this case, the network management system may not be able to directly clean up user sessions on all of the network nodes. The techniques presented herein provide a combination of in-band and out-of-band communications to enable a managed network to handle this use case. The network management entity may send a critical configuration modification notification to the SMF and the SMF takes the necessary actions to clean up the user sessions on the UPF.

Bulk session cleanup may be used in various scenarios involving multiple user session at the level of the DNN or Access Point Name (APN). In one example, a change in critical configuration in the SMF (e.g., a change/removal in ACL, VRF, or policy modification). In another example, the removal of a DNN/APN may lead the SMF to release the existing session at the SMF/UPF to ensure a consistent state for the network system. In a further example, an internal failure or administrative trigger at a UPF may lead to a UPF-triggered bulk session cleanup. In yet another example, a policy change at the Policy Control Function (PCF) may affect a group of user session leading to a bulk session cleanup.

In another use case, a private 5G network system may be deployed for factory automation. The factory operator may upgrade a logical group of devices (e.g., a cameras on the first floor of a particular department). In this use case, the devices may be grouped together and the network nodes may release all of the device user sessions to enable the installation of software upgrades in the group of devices.

The techniques described herein provide for improvements to the N4 interface (i.e., between the SMF and UPF), PFCP enhancements, and a mechanism for identifying and grouping user sessions at the DNN, group ID, and gNB level. The enhancements may be applied at various control plane functions (e.g., SMF, PCF) as well as at the UPF of a 5G system whenever there is a critical configuration change or other trigger. These techniques enables bulk session cleanup or session modification (e.g., Access Network tunnel information reset) with a single standardized control message rather than multiple individual control messages, which may flood the N4 interface and consume SMF, UPF, and network resources for each session. The bulk session cleanup mechanism described herein uses a single control message to handle the cleanup of multiple user sessions at the SMF/UPF. Additionally, the techniques described herein enable various entities (e.g., UPF, PCF) in the network system to trigger session release at the SMF.

The Technical Specification 29.244 of the 3GPP standards defines a PFCP Session Set Deletion Request that is used for FQ-CSID-related partial failure of 4G nodes. In contrast, the techniques presented herein enable a set of PFCP sessions to be deleted for a set of user sessions associated with a group identifier, a specific DNN, or a specific gNB. In one example, the existing PFCP Session Set Deletion message exchange may be enhanced to enable a single message to clean up an entire set of user session. However, the techniques described herein are not limited to any specific message semantics, and may be used to enable the functionality of deleting user sessions from triggers of the UPF, SMF, or PCF when a critical configuration (e.g., QoS policy, ACL, VRF) is changed or when a network operator resets all sessions related to a DNN, gNB, or other group identifier (e.g., a group of factory floor cameras set to be upgraded).

Referring now to FIG. 1, an example of a network system 100 managed by a network management entity 105 is shown. In one example, the network management entity may be based on a DNA-C platform by Cisco®. The network system provides connectivity to User Equipment (UE) 110 and 115 through a Radio Access Network (RAN) 120. In one example, the RAN 120 may include one or more gNB nodes to provide wireless access for the UE 110 and UE 115. Access to the network system 100 is managed by an Access and Mobility Management Function (AMF) 130, which is connected to the RAN 120.

An SMF 140 manages user sessions for the UE 110 and 115 and includes bulk session logic 142 and a session group database 144. The bulk session logic 142 enables the SMF 140 to perform the techniques described herein as being performed by an SMF. The session group database 144 stores an association between user sessions and one or more identifiers (e.g., DNN, gNB, logical group ID, etc.).

A PCF 150 manages the policies for the network system 100, and includes bulk session logic 152 and session group database 154. The bulk session logic 152 enables the PCF 150 to perform the techniques described herein as being performed by a PCF. The session group database 154 stores an association between user sessions and one or more identifiers (e.g., DNN, gNB, logical group ID, etc.).

A UPF 160 manages the user plane connections to a data network (DN) 170 for the network system 100. The UPF 160 includes bulk session logic 162 and session group database 164. The bulk session logic 162 enables the UPF 160 to perform the techniques described herein as being performed by a UPF. The session group database 164 stores an association between user sessions and one or more identifiers (e.g., DNN, gNB, logical group ID, etc.). Although not illustrated in FIG. 1, in some embodiments, network management entity 105 may also interface with UPF 160.

Figure 2:
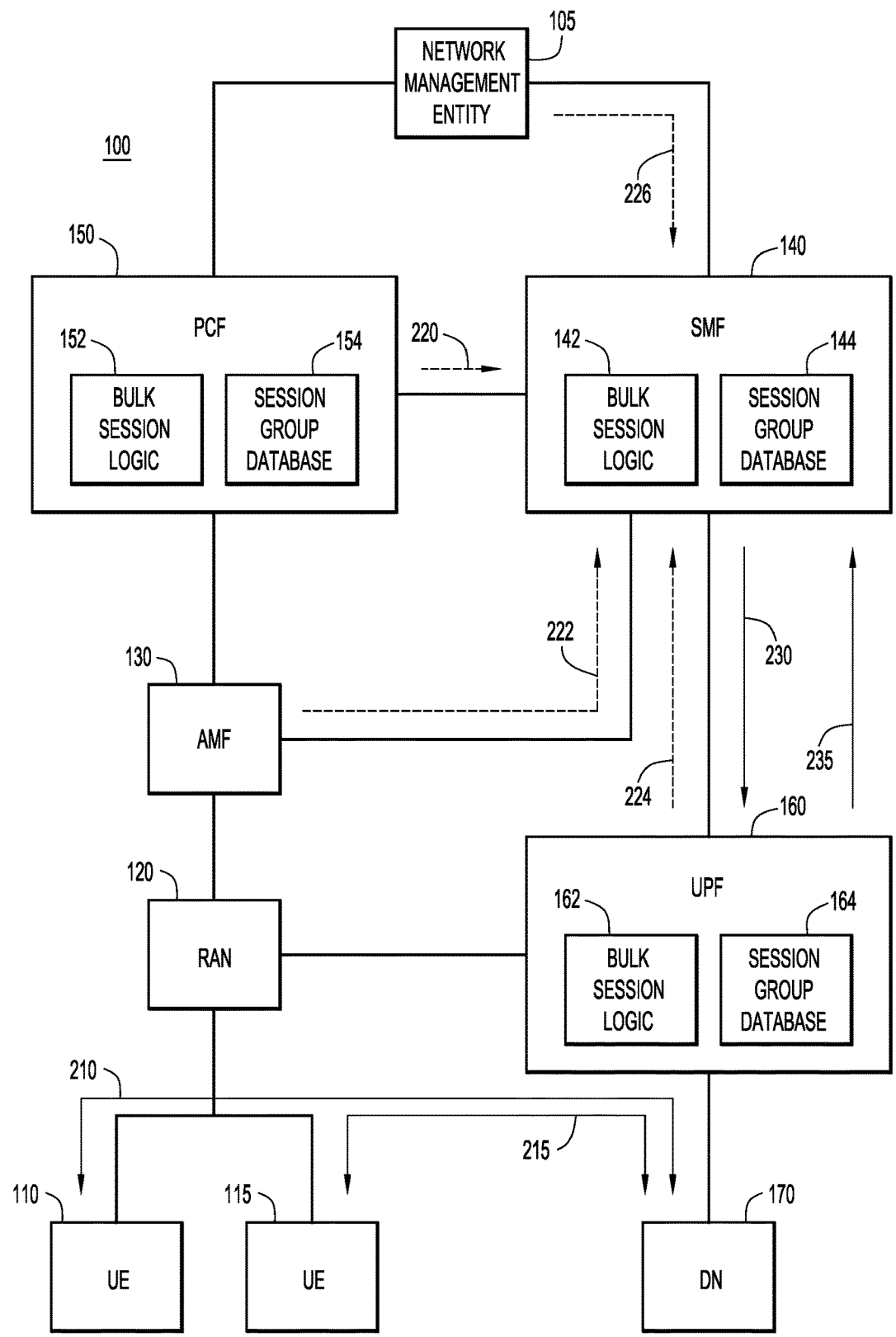
FIG. 2 is a simplified block diagram illustrating the network system performing a bulk session cleanup, according to an example embodiment.

Referring now to FIG. 2, messages in the network system 100 are shown for cleaning up multiple user sessions. The network system 100 provides a user session 210 to the UE 110 through the RAN 120 and the UPF 160 to the DN 170. The network system also provides a user session 215 to the UE 115 through the RAN 120 and the UPF 160 to the DN 170. The SMF 140 receives a trigger notifying the SMF 140 that a change in the network system 100 affects multiple user sessions (e.g., session 210 and 215) to be terminated and cleaned up. The trigger may be a trigger 220 from the PCF 150, a trigger 222 from the AMF 130, a trigger 224 from the UPF 160, or a trigger 226 from the network management entity 105.

In one example, the trigger 220 from the PCF 150 may indicate that a policy affecting a group of UEs (e.g., UE 110 and 115) has changed, and the user sessions (e.g., session 210 and 215) associated with that group of UEs should be ended and cleaned up. In another example, the trigger 222 from the AMF 130 may indicate that a particular gNB from the RAN 120 has failed, and the user sessions for UEs attached to that particular gNB need to be cleaned up. In a further example, the trigger 224 from the UPF 160 may indicate that a change in configuration of the UPF 160 affects a particular group of UEs and initiate a cleanup of the user sessions associated with that particular group of UEs. In still another example, the trigger may be internal to the SMF 140, such as detecting a configuration change that affects a particular group of user sessions.

To terminate and clean up the user sessions associated with a group of UEs, the SMF 140 sends one session release request 230 that identifies the group of user sessions to be released. In one example, the session release request 230 may identify the group of user sessions by an identifier stored in the session group database 144, such as a DNN/APN, gNB, or group ID. The SMF 140 may also act to release the group of user sessions associated with the identifier, e.g., clean up any settings or configuration options associated with the group of user sessions that are being released.

The UPF 160 receives the session release request 230 and determines which individual user sessions (e.g., session 210 and 215) are associated with the session release request 230 and releases those user sessions. In another example, the UPF 160 may identify the group of user sessions associated with the session release request 230 by searching for an identifier stored in the session group database 164, such as a DNN/APN, gNB, or group ID, and determining which user sessions are associated with the identifier.

After releasing the user sessions identified in the session release request 230, the UPF 160 sends one session release response 235 acknowledging that the user sessions have been released. The SMF 140 and the UPF 160 use the single message exchange of the session release request 230 and the session release response 235 to perform a bulk cleanup of all of the user sessions identified in the session release request 230 and the session release response 235.

Figure 3:
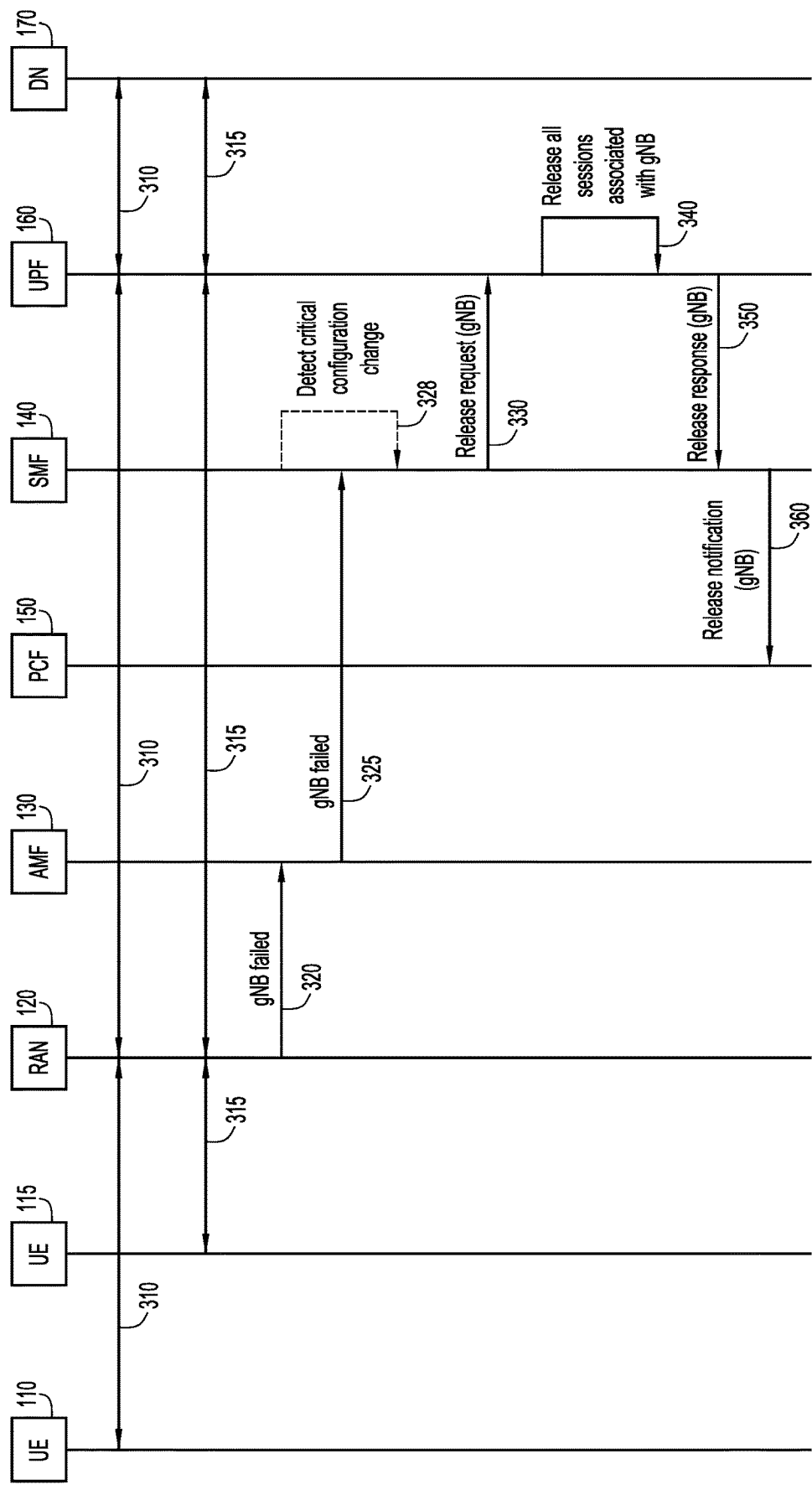
FIG. 3 is a message flow diagram illustrating messages within a network system to perform a bulk session cleanup triggered from a Session Management Function (SMF), according to an example embodiment.

Referring now to FIG. 3, a message flow diagram illustrates messages between elements of the network system 100 to perform a bulk release triggered by the SMF 140 when a gNB of the RAN 120 fails. The UE 110 is connected to the data network 170 in a user session 310 through the RAN 120 and the UPF 160. Similarly, the UE 115 is connected to the data network 170 in a user session 315 through the RAN 120 and the UPF 160. In one example, the user session 310 and 315 are connected through the same gNB in the RAN 120.

When a gNB fails, the RAN 120 sends a notification 320 to the AMF 130, which forwards a notification 325 to the SMF 140 that the gNB has failed. In one example, the AMF 130 may detect the gNB failure without explicitly receiving the notification 320, and send the notification 325 to the SMF 140. The notification 325 triggers the SMF 140 to clean up any user sessions associated with the failed gNB. In another example, the SMF 140 may be triggered to initiate the bulk session cleanup by detecting a critical configuration change at 328 rather than by receiving the notification from the AMF 130.

The SMF 140 generates a bulk session release request 330 that identifies the failed gNB and send the bulk session release request 330 to the UPF 160. The UPF 160 receives the bulk session release request 330 and identifies all of the user sessions (e.g., user session 310 and 315) that were using the failed gNB. At 340, the UPF releases all of the users sessions associated with the failed gNB. In one example, the UPF 160 cleans up and/or updates forwarding information of N3 tunnel information with the RAN 120.

After the UPF 160 releases all of the user sessions associated with the failed gNB, the UPF 160 sends a bulk session release response 350 to the SMF 140 identifying the gNB. The SMF 140 may ensure that at least one other control function (e.g., PCF 150) has an accurate listing of the user sessions by sending a bulk session release notification 360 to the PCF 150. The bulk session release notification 360 identifies the gNB, enabling the PCF 150 to determine which user sessions were cleaned up.

The example shown in FIG. 3 illustrates the SMF 140 being triggered to clean up multiple user session due to a failed gNB, but other events may trigger the SMF 140 to perform a bulk session cleanup. For instance, an operator may change a critical configuration related to a DNN/ACL/VRF/QoS policy at the SMF 140. The bulk session release request 330 may identify which user sessions to clean up by including the DNN, the gNB address, or a group identifier.

In another example, during session establishment, the UPF 160 may store a list of user sessions being served by a DNN, gNB, or group identifier. The UPF 160 compares the list of associated sessions to the DNN/gNB/group identifier in the bulk session release request 330 to determine which user sessions to update and/or delete.

In a further example, the bulk session release notification 360 may be a bulk session termination request from the SMF 140 to the PCF 150 for cleanup of sessions pertaining to a particular DNN or group identifier. The PCF 150 may maintain a list of Diameter session identifiers that map to DNNs and/or group identifiers. On receiving the bulk session release notification 360, the PCF may obtain the session list of associated user sessions and clean up those sessions at the PCF 150.

In a further example, bulk session release request 330 may be an enhancement to the existing PFCP Session Set Deletion Request message. The enhanced PFCP Session Set Deletion Request message may be enhanced to include a DNN, gNB address, or other group identifier for triggering bulk session cleanup.

In a specific example, the bulk session release request 330 may be a PFCP message that includes the Information Elements (IEs) listed in Table 1:

TABLE 1

PFCP Bulk Session Release Request IEs

| Information Elements | Plane | Condition/Comment | IE Type |
|---|---|---|---|
| Node ID | M | This IE shall contain the unique identifier of the sending node | Node ID |
| APN/DNN | C | This shall contain the DNN or APN name when the critical configuration related to APN/VRF/ACL/QoS policy has changed resulting in all sessions belonging to the DNN to be released | APN/DNN |
| Remote GTP Peer | C | This IE shall include the IP address of the remote GTP peer towards which the control plane detects failure and associated session that need to be cleaned up at the UPF | Remote GTP-U Peer |
| Group ID | C | This shall contain the group identifier for the Protocol Data Unit (PDU) sessions that are to be deleted. This IE is to handle group level policy cleanup scenarios triggered from a network management entity | Group ID |

The Group ID IE includes the group identifier for a PDU session and may be encoded as shown in Table 2:

TABLE 2

| | Group ID | | | | | | | |
|---|---|---|---|---|---|---|---|---|
| | Bits | | | | | | | |
| Octets | 8 | 7 | 6 | 5 | 4 | 3 | 2 | 1 |
| 1 to 2 | Type = 170 (decimal) | | | | | | | |
| 3 to 4 | Length = n | | | | | | | |
| 5 to 8 | Group ID value | | | | | | | |
| 9 to (n + 4) | These octet(s) is/are present only if explicitly specified | | | | | | | |

Additionally, the bulk session release response 350 may be a PFCP message including the IEs listed in Table 3:

TABLE 3

PFCP Bulk Session Release Response IEs

| Information Elements | Plane | Condition/Comment | IE Type |
|---|---|---|---|
| Cause | M | This IE shall indicate the acceptance or rejection of the corresponding request message | Cause |

TABLE 3-continued

PFCP Bulk Session Release Response IEs

| Information Elements | Plane | Condition/Comment | IE Type |
|---|---|---|---|
| Offending IE | C | This IE shall be included if the rejection is due to a conditional or mandatory IE that is missing or faulty | Offending IE |

Figure 4:
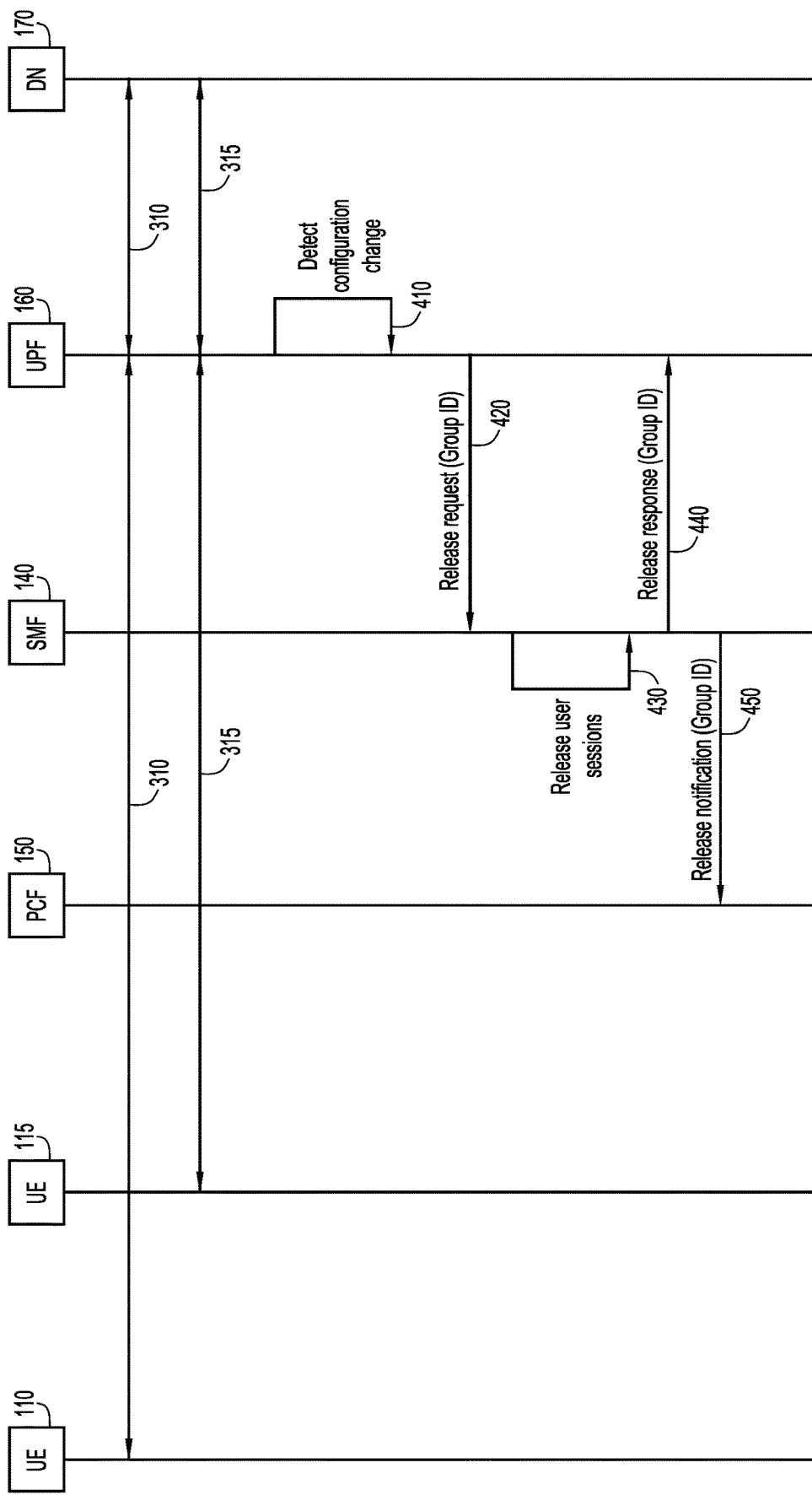
FIG. 4 is a message flow diagram illustrating messages within a network system to perform a bulk session cleanup triggered from a User Plane Function (UPF), according to an example embodiment.

Referring now to FIG. 4, a message flow diagram illustrates messages between elements of the network system 100 to perform a bulk release triggered by the UPF 160. Similar to FIG. 3, the UEs 110 and 115 are connected to the data network 170 in user sessions 310 and 315, respectively. The RAN 120 shown in FIG. 3 is omitted from FIG. 4 for clarity.

In one example, the QoS policy, ACL configuration, and VRF configuration are present on the UPF 160 because these policies are applied at the UPF 160. If these critical configurations are modified or removed by an operator (e.g., using a Command Line Interface (CLI) or other configuration management interface), then the UPF 160 may be triggered to signal the SMF 140 to clean up the sessions affected by the configuration change.

On detecting the critical configuration change that affects multiple user sessions, such as user sessions 310 and 315 at 410, the UPF 160 sends a bulk session release request 420 to the SMF 140. In one example, the configuration change detected at 410 may affect a particular group of user sessions belonging to a particular group identifier or DNN. The bulk session release request 420 may identify the group identifier or DNN.

The SMF 140 determines which user sessions are being released based on the group identifier in the bulk session release request 420 and releases the identified user sessions at 430. After releasing the user sessions at 430, the SMF 140 sends a bulk session release response 440 to the UPF 160. The SMF 140 may also send a bulk session release notification 450 to at least one other control plane function, such as the PCF 150, and indicate the group identifier of the user sessions that have been released.

In one example, the N4 interface between the UPF 160 and SMF 140 may be modified to carry the bulk session release request 420 as a PFCP Session Set Deletion Request that has been enhanced to carry additional IEs identifying the group identifier or DNN (e.g., the IEs described in Table 1). Similarly, the bulk session release response 440 from the SMF 140 to the UPF 160 may be a PFCP Session Set Deletion Response enhanced with additional IEs, e.g., the IEs described in Table 3.

In another example, the bulk session release request 420 may be used to initiate a session release for an individual user session from the UPF 160 rather than from the SMF 140, as is typical for 3GPP standards. Failures at the UPF 160 or administrative triggers may lead to a user session cleanup triggered from the UPF 160. The bulk session release request 420 enables the UPF 160 to initiate the session release of individual user sessions or multiple user sessions.

Figure 5:
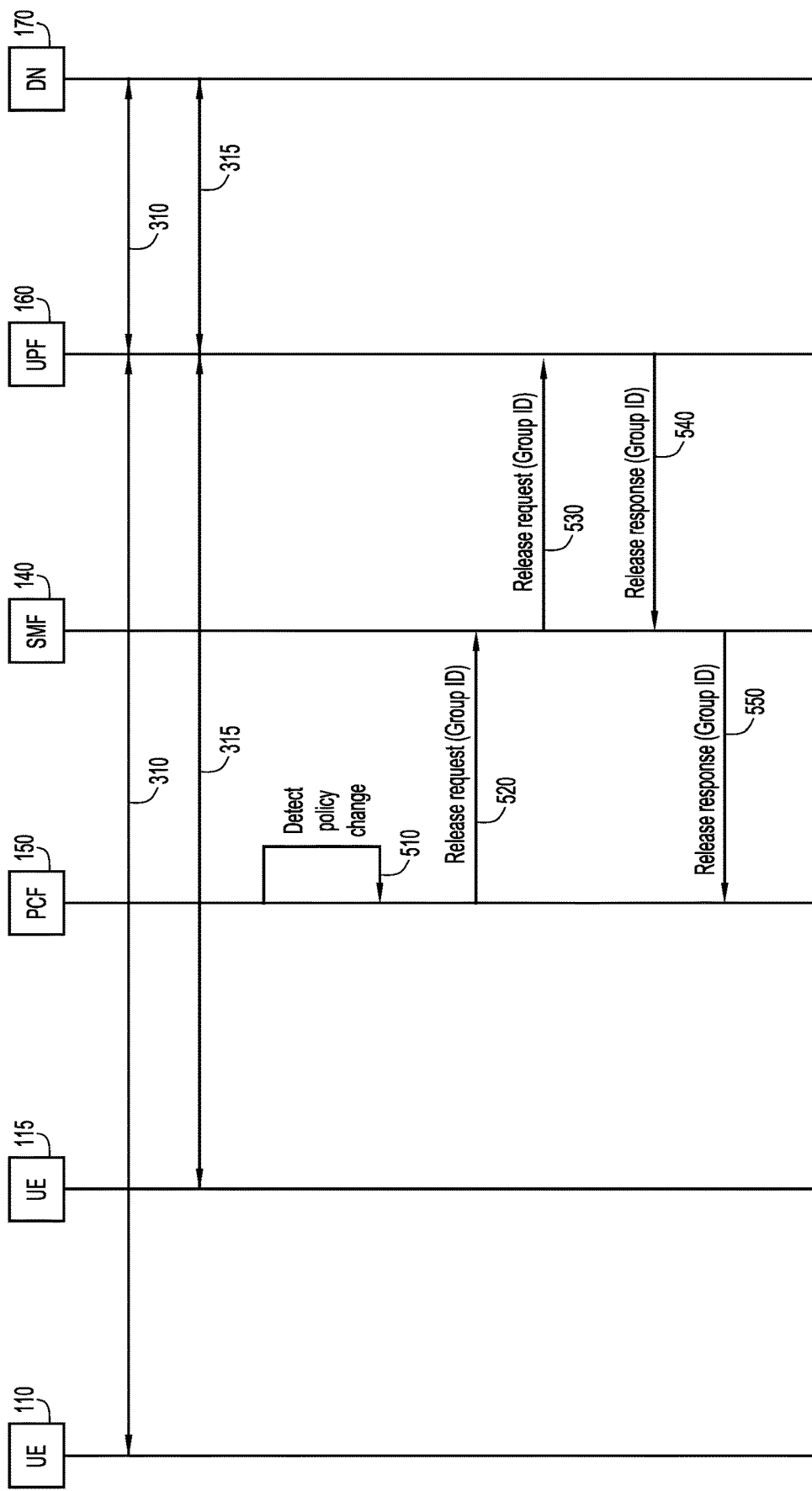
FIG. 5 is a message flow diagram illustrating messages within a network system to perform a bulk session cleanup triggered from a Policy Control Function (PCF), according to an example embodiment.

Referring now to FIG. 5, a message flow diagram illustrates messages between elements of the network system 100 to perform a bulk release triggered by the PCF 150. Similar to FIG. 3, the UEs 110 and 115 are connected to the data network 170 in user sessions 310 and 315, respectively. The RAN 120 shown in FIG. 3 is omitted from FIG. 5 for clarity.

At 510, the PCF 150 detects a policy change that affects multiple user sessions, such as user sessions 310 and 315. In one example, the policy change may be a change in QoS policy, security policy, or other policy that affects a group of user sessions. The PCF 150 generates a bulk session release request 520 that identifies the group of user sessions (e.g., with a group identifier), and sends the bulk session release request 520 to the SMF 140. The SMF 140 determines the user sessions associated with the bulk session release request 520 and releases the associated user sessions by sending a bulk session release request 530 to the UPF 160.

The UPF 160 receives the bulk session release request 530 and releases the associated user sessions, e.g., the user sessions associated with a group identifier in the bulk session release request 530. When the user sessions have been released, the UPF 160 sends a bulk session release response 540 to the SMF 140 to indicate that the user sessions have been released. The SMF 140 sends a bulk session release response 550 to the PCF 150 to indicate that all of the user sessions associated with the bulk session release request 520 have been released and cleaned up at the SMF 140 and the UPF 160.

In one use case, UEs 110 and 115 are grouped into a logical set of devices at the PCF 150 when each UE 110 and 115 establishes the user session 310 and 315, respectively. For upgrades or maintenance of the group of devices the PCF 150 may send a message (e.g. bulk session release request 520) to the SMF 140 with a group identifier corresponding to the group of devices. The message may be in the form of a configuration shut/disable for the group or as a separate message. On receiving this message, the SMF 140 sends the bulk session release request 530 to the UPF 160 to clean up the user sessions associated with the group of devices.

Figure 6:
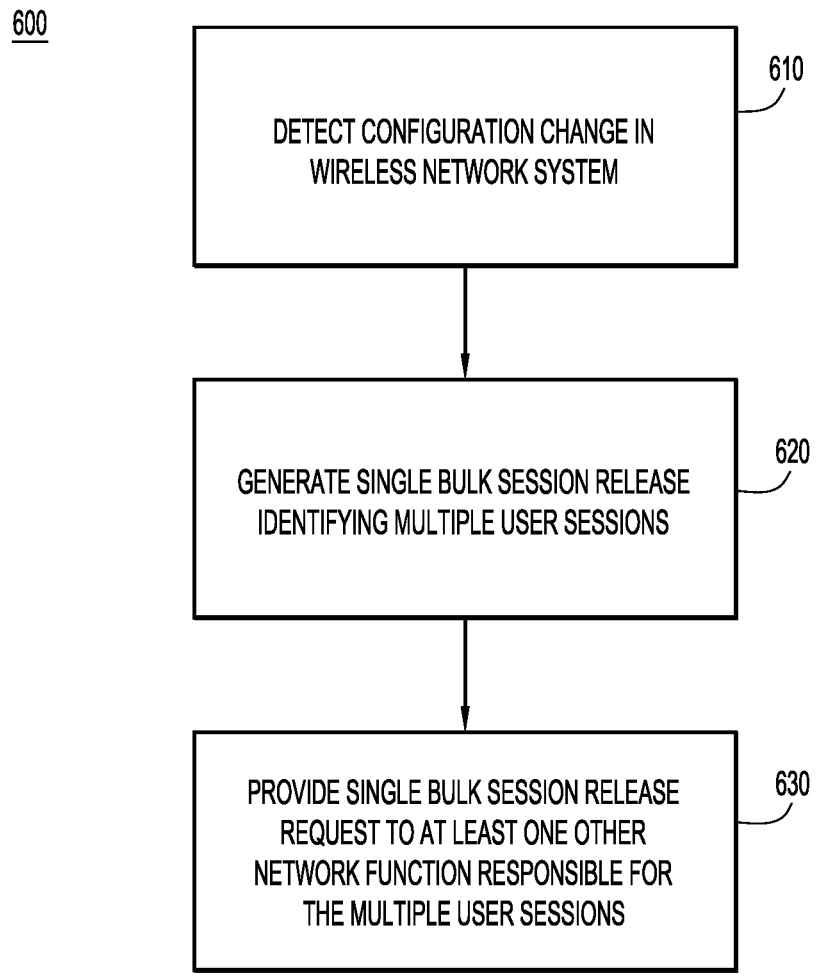
FIG. 6 is a flowchart illustrating operations performed at a Session Management Function (SMF) or a User Plane Function (UPF) to perform a bulk cleanup of user sessions, according to an example embodiment.

Referring now to FIG. 6, a flowchart illustrates operations performed by a network function (e.g., SMF 140 or UPF 160) in a process 600 for cleaning up a plurality of user sessions with a single message exchange. At 610, the network function detects a configuration change in a wireless network system. In one example, the network function may detect a change in network policy or security policy. In another example, the network function may detect a failure in the wireless network system (e.g., a gNB failure). A gNB failure may affect multiple users sessions that were using the failed gNB to connect to the wireless network system. In another example, a policy change or administrative action may select a group of UEs to update, which involves releasing the current user sessions.

At 620, the network function generates a single bulk session release request that identifies a plurality of user sessions by the configuration change. In one example, the plurality of user sessions may be identified by including a DNN, gNB, or group identifier in the bulk session release request. At 630, the network function provides the single bulk sessions release request to at least one other network function responsible for the plurality of user sessions. In one example, the network function may be an SMF sending the single bulk session release request to a UPF. Alternatively, the network function may be a UPF sending the single bulk session release request to an SMF.

If the configuration change only affects a single user session and does not affect multiple user sessions, the network function may generate a conventional session release request identifying the particular user session affected by the configuration change and provide the conventional session release request to at least one other network function responsible for the particular user session. Alternatively, the network function may generate a bulk session release with a group identifier to which only the particular user session currently belongs. For instance, the network function may generate a bulk session release identifying a particular gNB that only a single user session is currently using to connect to the network. The network function may send the bulk session release identifying the gNB rather than sending a conventional session release identifying the user session.

Figure 7:
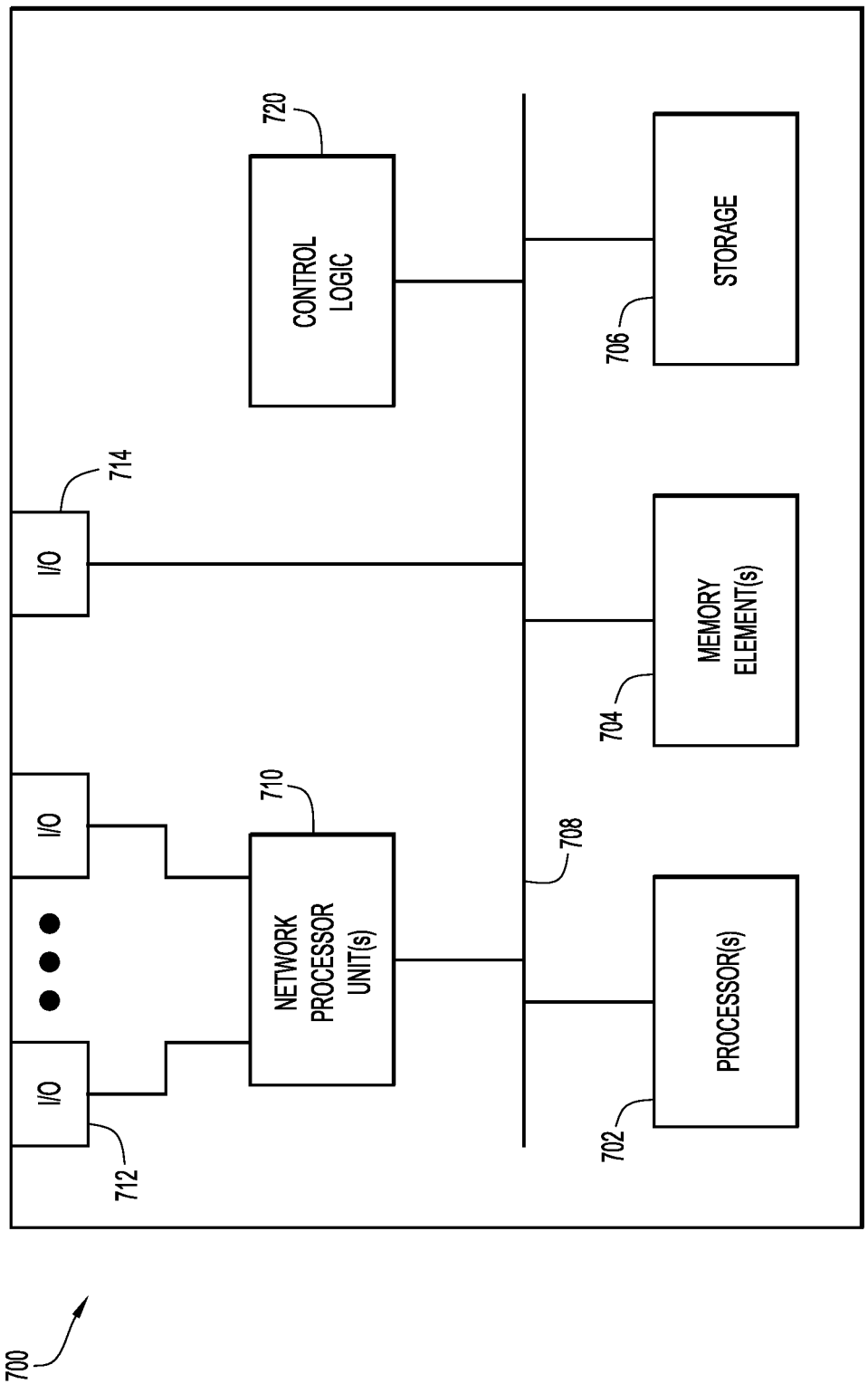
FIG. 7 illustrates a simplified block diagram of a device that may be configured to perform the methods presented herein, according to an example embodiment.

Referring to FIG. 7, FIG. 7 illustrates a hardware block diagram of a computing device 700 that may perform functions associated with operations discussed herein in connection with the techniques depicted in FIGS. 1-6. In various embodiments, a computing device, such as computing device 700 or any combination of computing devices 700, may be configured as any entity/entities as discussed for the techniques depicted in connection with FIGS. 1-6 in order to perform operations of the various techniques discussed herein.

In at least one embodiment, the computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, and/or any other I/O port(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computer device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fib®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, the techniques presented herein significantly reduce control plane signaling (e.g., between SMF and UPF) when cleaning up multiple user sessions. A critical configuration change or an upgrade of a group of user devices are specific use cases that affect multiple user sessions. The 3GPP only defines standards for a single session cleanup from the SMF to the UPF, with no provision for bulk session cleanup for a particular DNN, gNB, or other group identifier. Sending a single session release request/response with an identifier associated with multiple user sessions prevents a flood of individual session release requests/responses when a single event affects multiple user sessions.

In one form, a method is provided for a network function to initiate a bulk session cleanup with a single release request. The method includes detecting a configuration change to a wireless network system. The configuration change affects a plurality of user sessions for a plurality of UE. The method also includes generating a single bulk session release request identifying the plurality of user sessions and provides the single bulk session release request to at least one other network function responsible for the plurality of user sessions.

In another form, an apparatus comprising a network interface and a processor is provided. The network interface is configured to communicate with a plurality of computing devices in a wireless network system. The processor is coupled to the network interface, and configured to detect a configuration change to the wireless network system. The configuration change affects a plurality of user sessions for a plurality of UE. The processor is further configured to generate a single bulk session release request identifying the plurality of user sessions and cause the network interface to provide the single bulk session release request to at least one other network function responsible for the plurality of user sessions.

In still another form, a non-transitory computer readable storage media is provided that is encoded with instructions that, when executed by a processor of an SMF device of a wireless network system, cause the processor to detect a configuration change in the wireless network system. The configuration change affects a plurality of user sessions for a plurality of UE. The instructions further cause the processor generate a single bulk session release request identifying the plurality of user sessions and provide the single bulk session release request to at least one other network function responsible for the plurality of user sessions.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   detecting at a User Plane Function (UPF) device in a wireless network system, a configuration change to the wireless network system, the configuration change affecting a plurality of user sessions for a plurality of User Equipment (UE);
   generating a single bulk session release request identifying the plurality of user sessions; and
   providing the single bulk session release request from the UPF device to a Session Management Function (SMF) device responsible for the plurality of user sessions.

2. The method of claim 1, further comprising obtaining a single bulk session release response from the SMF device, the single bulk session release response identifying the plurality of user sessions.

3. The method of claim 1, further comprising storing an association between the plurality of user sessions and a group identifier.

4. The method of claim 3, further comprising acting to release the plurality of user sessions, wherein the single bulk session release request identifies the plurality of user sessions by the group identifier.

5. The method of claim 3, wherein the group identifier is associated with a Data Network Name (DNN), a next Generation Node B (gNB), a logical group of UEs, or a type of UE.

6. The method of claim 1, wherein the configuration change is related to a next Generation Node B (gNB) failure, a policy change, a Session Management Function (SMF) configuration change, or a User Plane Function (UPF) configuration change.

7. The method of claim 1, wherein detecting the configuration change to the wireless network system comprises obtaining a notification of the configuration change from a network management entity.

8. An apparatus comprising:
a network interface configured to communicate with a plurality of computing devices in a wireless network system; and
a processor coupled to the network interface, the processor configured to:
detect a configuration change to the wireless network system, the configuration change affecting a plurality of user sessions for a plurality of User Equipment (UE);
generate a single bulk session release request identifying the plurality of user sessions; and
cause the network interface to provide the single bulk session release request to a Session Management Function (SMF) device responsible for the plurality of user sessions.

9. The apparatus of claim 8, wherein the processor is further configured to obtain a single bulk session release response from the SMF device via the network interface, the single bulk session release response identifying the plurality of user sessions.

10. The apparatus of claim 8, further comprising a memory configured to store an association between the plurality of user sessions and a group identifier.

11. The apparatus of claim 10, wherein the processor is further configured to act to release the plurality of user sessions, and wherein the single bulk session release request identifies the plurality of user sessions by the group identifier.

12. The apparatus of claim 10, wherein the group identifier is associated with a Data Network Name (DNN), a next Generation Node B (gNB), a logical group of UEs, or a type of UE.

13. The apparatus of claim 8, wherein the processor is configured to detect the configuration change is related to a next Generation Node B (gNB) failure, a policy change, a Session Management Function (SMF) configuration change, or a User Plane Function (UPF) configuration change.

14. The apparatus of claim 8, wherein the processor is configured to detect the configuration change to the wireless network system by obtaining a notification of the configuration change from a network management entity via the network interface.

15. One or more non-transitory computer readable storage media encoded with software comprising computer executable instructions and, when the software is executed on a processor a User Plane Function (UPF) device of a wireless network system, operable to cause a processor to:
detect a configuration change to the wireless network system, the configuration change affecting a plurality of user sessions for a plurality of User Equipment (UE);
generate a single bulk session release request identifying the plurality of user sessions; and
provide the single bulk session release request to a Session Management Function (SMF) device responsible for the plurality of user sessions.

16. The one or more non-transitory computer readable storage media of claim 15, wherein the software is further operable to cause the processor to obtain a single bulk session release response from the SMF device, the single bulk session release response identifying the plurality of user sessions.

17. The one or more non-transitory computer readable storage media of claim 15, wherein the software is further operable to cause the processor to store an association between the plurality of user sessions and a group identifier.

18. The one or more non-transitory computer readable storage media of claim 17, wherein the software is further operable to cause the processor to act to release the plurality of user sessions, wherein the single bulk session release request identifies the plurality of user sessions by the group identifier.

19. The one or more non-transitory computer readable storage media of claim 17, wherein the group identifier is associated with a Data Network Name (DNN), a next Generation Node B (gNB), a logical group of UEs, or a type of UE.

20. The one or more non-transitory computer readable storage media of claim 15, wherein the software is further operable to cause the processor to detect the configuration change to the wireless network system by obtaining a notification of the configuration change from a network management entity.

\* \* \* \* \*